United States Patent
Goto et al.

(10) Patent No.: US 6,726,261 B2
(45) Date of Patent: Apr. 27, 2004

(54) BUMPER REINFORCEMENT

(75) Inventors: Hiroshi Goto, Soja (JP); Koji Shimotsu, Soja (JP)

(73) Assignee: Om Corporation, Okayama (JP)

( * ) Notice: Subject to any disclaimer, the term of this patent is extended or adjusted under 35 U.S.C. 154(b) by 103 days.

(21) Appl. No.: 10/364,202

(22) Filed: Feb. 11, 2003

(65) Prior Publication Data

US 2003/0155806 A1 Aug. 21, 2003

(30) Foreign Application Priority Data

Feb. 19, 2002 (JP) ........................ 2002-041507

(51) Int. Cl.⁷ ................................ B60R 19/02
(52) U.S. Cl. ............................................ 293/120
(58) Field of Search ................... 293/102, 117, 293/120, 121, 122, 130

(56) References Cited

U.S. PATENT DOCUMENTS

| | | | | |
|---|---|---|---|---|
| 3,827,740 A | * | 8/1974 | Golze et al. | 293/120 |
| 4,998,761 A | | 3/1991 | Bayer et al. | |
| 5,122,398 A | * | 6/1992 | Seiler et al. | 293/120 |
| 5,290,078 A | * | 3/1994 | Bayer et al. | 293/120 |
| 5,340,178 A | * | 8/1994 | Stewart et al. | 293/122 |
| 6,003,912 A | * | 12/1999 | Schonhoff et al. | 293/122 |
| 6,217,089 B1 | * | 4/2001 | Goto et al. | 293/122 |
| 2003/0020291 A1 | * | 1/2003 | Roussel et al. | 293/120 |

FOREIGN PATENT DOCUMENTS

| | | | | | |
|---|---|---|---|---|---|
| JP | 358211943 A | * | 12/1983 | | 293/102 |
| JP | 362151322 A | * | 7/1987 | | 293/120 |
| JP | 06-328988 | | 11/1994 | | |
| JP | 2001-322517 | | 11/2001 | | |

* cited by examiner

Primary Examiner—Joseph D. Pape
Assistant Examiner—Jason Morrow
(74) Attorney, Agent, or Firm—Koda & Androlia

(57) ABSTRACT

A bumper reinforcement attached to a front or a rear side of a vehicle frame as a strength member comprising: a bumper beam to be supported on the vehicle frame, and a reinforcement member attached to the bumper beam on a forward surface thereof which is upstream with respect to an impact exertion direction, wherein: the reinforcement member has a concave portion of a substantially C-shaped cross section projecting in a downstream direction reverse to the impact exertion direction, the bumper beam has a groove portion extending longitudinally of the reinforcement member on the forward surface to which the reinforcement member is attached, and the reinforcement member and the bumper beam are engaged by joining a bottom surface of the concave portion and a surface of the groove portion.

5 Claims, 13 Drawing Sheets

BUMPER REINFORCEMENT

BACKGROUND OF THE INVENTION

1. Field of the Invention

The present invention relates to a bumper reinforcement constructed for a part of a bumper of a vehicle.

2. Description of the Related Art

For protection of a vehicle body, a driver and other people in a vehicle such as a motorcar, a bumper is mounted on each of front and rear sides of a vehicle frame. The bumper comprises of a bumper reinforcement, as a strength member, supported by the vehicle frame, and a bumper cover, as a face member, contiguous with a vehicle exterior panel and covering the bumper reinforcement. An impact force F exerted on the bumper is absorbed substantially solely by the bumper reinforcement when the vehicle strikes another vehicle or other object. Possible impacts are grouped into light impacts and heavy impacts depending on the magnitude of the impact force F, and horizontal impacts and local impacts depending on the nature of the impact force F. The bumper reinforcement, which should protect the vehicle, driver and other people in the vehicle irrespective of the magnitude or nature of the impact force, has to be exchanged with a new one with increased frequency if it is intended to effectively absorb an impact force by deformation of the bumper reinforcement for every kind of impact. To this end, an improved bumper reinforcement has been proposed which is comprised of a bumper beam and a reinforcement member. The reinforcement member serves to absorb the impact force F in a light impact or a local impact while the bumper beam serves to absorb the impact force F in a heavy impact or a horizontal impact. This conventional art is exemplified by Japanese Patent Laid-Open Publication No. Hei 06-328988.

Specifically, according to the conventional bumper reinforcement, the reinforcement member deforms to absorb the impact force F at the beginning of exertion of the impact force or if the impact force F is small, and the bumper beam absorbs the impact force F with continued exertion of the impact force F or if the impact force F is large. This two-piece bumper reinforcement structure can achieve an increased degree of impact absorption performance compared to the conventional single-piece structure. Japanese Patent Laid-Open Publication No. 2001-322517 and U.S. Pat. No. 4,998,761 also disclose a similar two-piece bumper reinforcement.

In the bumper reinforcement of Japanese Patent Laid-Open Publication No. 2001-322517, a reinforcement member, which is to be mounted on a bumper beam at a forward surface remote from a vehicle frame, is provided with a substantially central portion that varies in cross-sectional shape so as to have a higher degree of rigidity with respect to a compressive load exerted in the front-to-rear direction compared to the remaining portions. This reinforcement member can easily absorb the impact force F as it has a slightly decreased strength tending to deform to a suitable extent. The bumper reinforcement of U.S. Pat. No. 4,998,761 is comprised of a bumper beam with a longitudinal rib, and a reinforcement member concealing the rib.

The ordinary conventional bumper reinforcement is comprised of a reinforcement member having a substantially convex cross section, and a bumper beam having a closed cross section (box type), as shown in FIG. 10 of the accompanying drawings. When a large impact force F is exerted on the bumper reinforcement, first the reinforcement member plastically deforms and then the bumper beam plastically deforms under the impact force F transmitted from the reinforcement member, thereby absorbing the impact force (FIGS. 11 or 12). The transition of this impact absorption is illustrated in FIG. 13, which is a graph showing a relationship between the amount of displacement of the bumper beam at the forward surface and the load (impact force F) necessary to cause displacement by such an mount. This graph indicates that the load has a peak with respect to the amount of displacement and the displacement of the bumper beam progresses with respect to the low load decreasing from the peak. For this reduction of amount of impact absorption, the impact force F is absorbed not by continuous plastic deformation of the bumper beam, but the forward surface of the bumper beam is bent about the portion on which a local impact force F is exerted.

According to the bumper reinforcement of U.S. Pat. No. 4,998,761, in the presence of the rib on the forward surface of the bumper beam, the local bending of the bumper beam can be retarded with plastic deformation across a wide area, thus realizing an increased amount of impact absorption compared to the conventional bumper reinforcement described in the preceding paragraph. However, in many cases, the reinforcement member extends along only a part of the entire length of the bumper beam, and in such an event, the impact force F is exerted on the rib of the bumper beam at the portion devoid of the reinforcement member so that an effective load receiving area of the forward surface of the bumper beam is reduced to cause plastic deformation only with the low load. Consequently, the present inventors have conducted studies in an effort to realize an improved bumper reinforcement in which (1) local bending of the bumper beam is retarded with plastic deformation allowed in a wider area to increase the amount of impact absorption, and (2) plastic deformation of the bumper beam does not occur at the portion devoid of the reinforcement member.

SUMMARY OF THE INVENTION

In view of the foregoing problems, it is an object of the present invention to provide a bumper reinforcement in which (1) local bending of a bumper beam is retarded with plastic deformation allowed in a wider area to increase the amount of impact absorption, and (2) plastic deformation of the bumper beam does not occur at the portion devoid of a reinforcement member.

To attain the above-described object, according to the present invention, there is provided a bumper reinforcement for being attached to a front side or a rear side of a vehicle frame as a strength member, comprising a bumper beam to be supported on the vehicle frame, and a reinforcement member attached to the bumper beam on a forward side thereof which is upstream with respect to an impact exertion direction, wherein the reinforcement member has a concave portion of a substantially C-shaped cross section projecting in a downward direction reverse to the impact exertion direction, the bumper beam has, on the forward surface to which the reinforcement member is attached, a groove portion extending longitudinally of the reinforcement member, and bottom surface of the concave portion of the reinforcement member engages with a surface of the groove portion of the bumper beam.

The term "the impact exertion direction" is a direction in which the impact force F is exerted on the vehicle, namely, a direction from the front side of the vehicle toward the rear side of the vehicle in the front bumper, for example, of the ordinary vehicle, identical to the forward-to-backward direction of the vehicle. Accordingly, the position where the reinforcement member is attached to the bumper beam is the forward surface of the bumper beam in accordance with the forward-to-backward direction of an ordinary vehicle. However, if the impact force F is exerted on the vehicle from the upper side or lower side depending on the type of the vehicle, the position where the reinforcement member is attached to the bumper beam may be varied in accordance with the impact exertion direction. In the following illustrative examples, with the impact exertion direction being defined as a direction from the front surface of the bumper beam toward the rear surface of the bumper beam, the reinforcement member is attached to the front surface of the bumper beam.

Because the substantially concave portion of the reinforcement member projects in the impact exertion direction, it is possible to concentrate the impact force F transmitted to the bumper beam at the bottom surface of the concave portion. Because of a groove portion extending longitudinally of the reinforcement member, the bumper beam has an increased rigidity on its front surface so that possible plastic deformation due to exertion of a local impact force F expands across a wide area (deformation enhancing effect). Since the groove portion of the bumper beam projects in an upward direction reverse to the impact exertion direction, the remaining flat or curved portion of the forward surface of the bumper beam can serve as a wide region for receiving load.

Alternatively, the bumper beam may have a plurality of groove portions. In such an alternative case, a single reinforcement member may have the same number of concave portions or the same number of reinforcement members may each have a single concave portion so that the bottom surface of each concave portion engages with a surface of one of the plurality of groove portions. The increase of rigidity of the forward surface of the bumper beam can be achieved basically by extending the groove portions substantially parallel (perfectly parallel and/or slightly aslant) to the longitudinal direction of the bumper beam. Although it is preferable for the bottom surface of each concave portion to engage with the surface of the respective groove portion over the entire area, they may be locally spaced from each other by, for example, a member separate from the bumper beam.

The required width (perpendicular to the longitudinal direction) of the groove portion is such that the bottom surface of the concave portion can engage with the surface of the groove portion and the remaining forward surface of the bumper beam and the groove surface can be a flat or curved surface. The inventor's experiments indicate that for forming a single groove portion in the flat forward surface of the bumper beam, the groove width is within a range of $1/8$–$4/8$, preferably $1/7$–$3/7$, of the width (perpendicular to the longitudinal direction) of the bumper beam. For forming a plurality of groove portions in the flat forward surface of the bumper beam, the total width of all the groove portions is within the above-described range of the width of the bumper beam. The formation of these groove portions are such that the surface of the groove portion is retracted from the forward surface of the bumper beam or the remaining forward surface of the bumper beam is relatively projected, the surface of the groove portion and the remaining forward surface of the bumper beam being parallel to each other and being connected to each other by slant side walls of the groove portion. The angle of inclination of each slant side wall in free form is preferably as small as possible because, when an impact force F is exerted on the bumper beam, the slant side walls plastically deform so as to be substantially perpendicularly to the remaining forward surface of the bumper beam, as they are pulled by the remaining forward surface of the bumper beam pushed backward by the backward surface of the concave portion of the reinforcement member.

According to the bumper reinforcement of the present invention, the above-described deformation enhancing effect can be realized reliably because the bottom surface of the concave portion of the reinforcement member engages with the surface of the groove portion of the bumper beam to transmit the impact force F from the reinforcement member to the groove portion of the bumper beam. This face-to-face engagement may be accomplished by merely pressing the bottom surface of the concave portion of the reinforcement member against the surface of the groove portion of the bumper beam. However, these two surfaces are preferably joined with one another to improve the aforementioned transmission of the impact force F and the deformation enhancing effect. As another preferable feature, the reinforcement member has a pair of support legs extending from symmetrical side edges of the concave portion to the bumper beam in parallel to the impact exertion direction so as to be joined with, by overlapping, two corresponding side surfaces of the bumper beam which surfaces are parallel to the impact exertion direction. Because of these support legs, it is possible to attach the reinforcement member to the bumper beam in a stable posture and to facilitate the transmission of the impact force F and the deformation enhancing effect as plastic deformation of the bumper beam is caused chiefly by the transmission of the impact force F from the concave portion of the reinforcement member to the groove portion of the bumper beam.

Basically the bumper beam has a structure of any cross-sectional shape such that the groove portion is normally formed on the forward surface of the bumper beam, the side where a reinforcement member is attached. Preferably the structure of the bumper beam may have (a) a closed cross-sectional shape provided by bending a single blank plate in such a manner that symmetrical side edges of the plate connect to each other, or (b) an open cross-sectional shape provided by bending a single blank plate in such a manner that symmetrical side edges of the plate extend toward and terminate short of each other. As another preferable feature, in the structure of the closed cross-sectional shape (a), (c) one of the side edges of the blank plate may be folded inwardly with the other side edge of the blank plate connecting to the folded edge portion, the folded side edge of the blank plate terminating in a reinforcing rib connecting to an inside surface of the bent plate diametrically.

The above and other objects, features and advantages of the invention will become more apparent from the following detailed description taken in conjunction with the accompanying drawings.

DETAILED DESCRIPTION OF THE INVENTION

Various preferred embodiments of the present invention will now be described with reference to the accompanying drawings.

Figure 1:
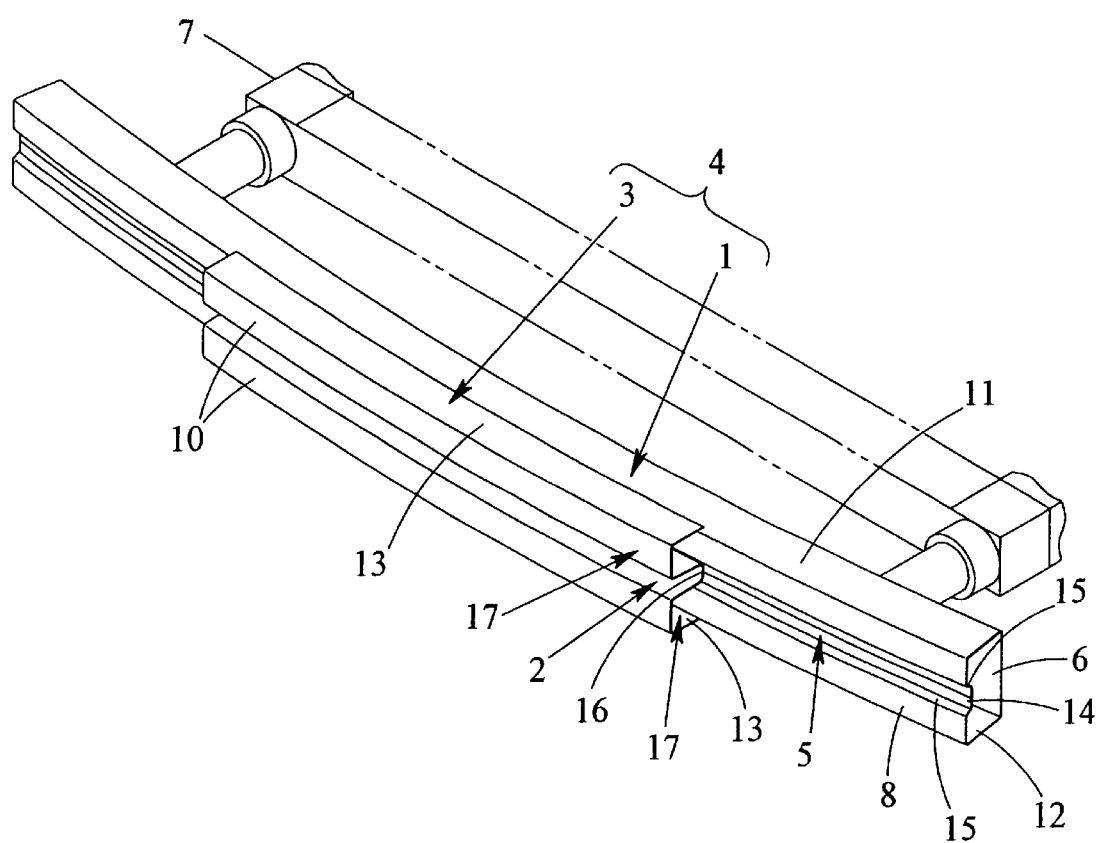
FIG. 1 is a perspective view of a bumper reinforcement of the present invention, showing a reinforcement member of a substantially C-shaped cross section attached to a bumper beam 1 having a structure of a closed cross section.
Figure 2:
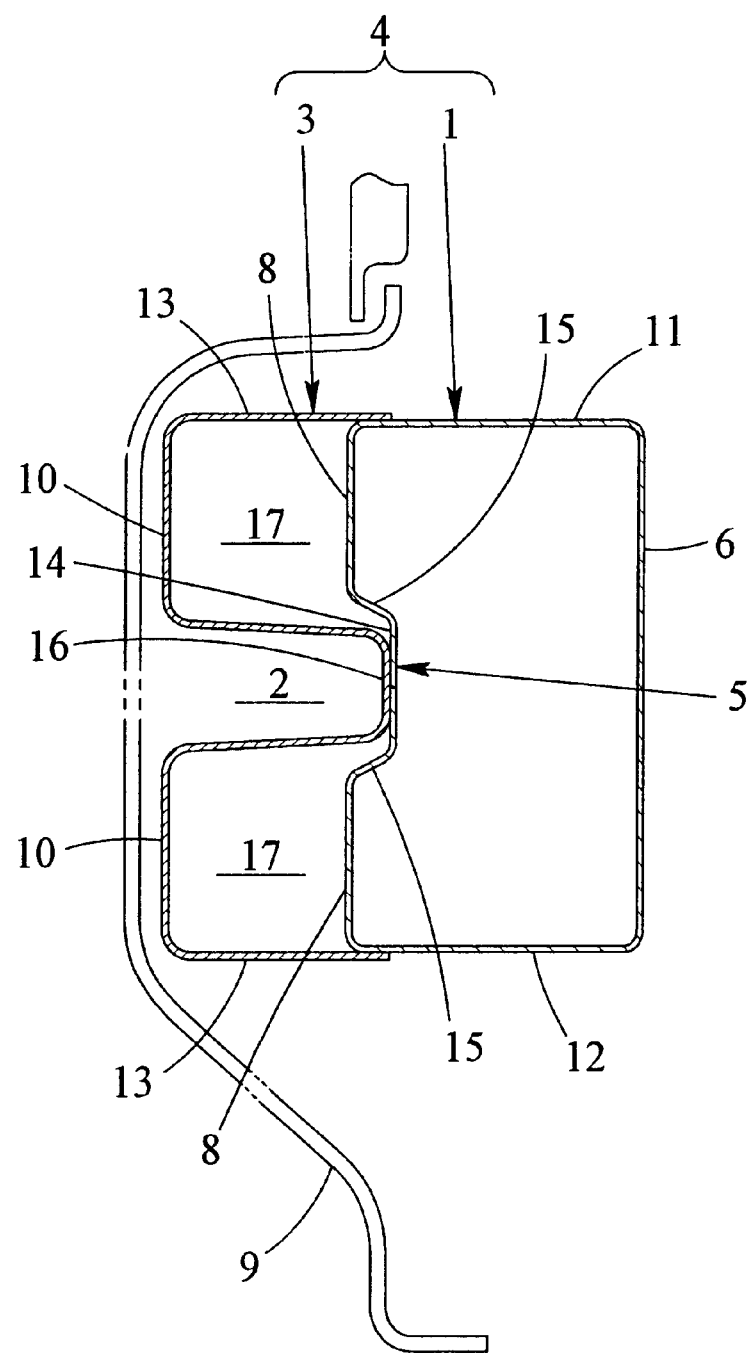
FIG. 2 is a vertical end elevation of the bumper reinforcement of FIG. 1.
Figure 3:
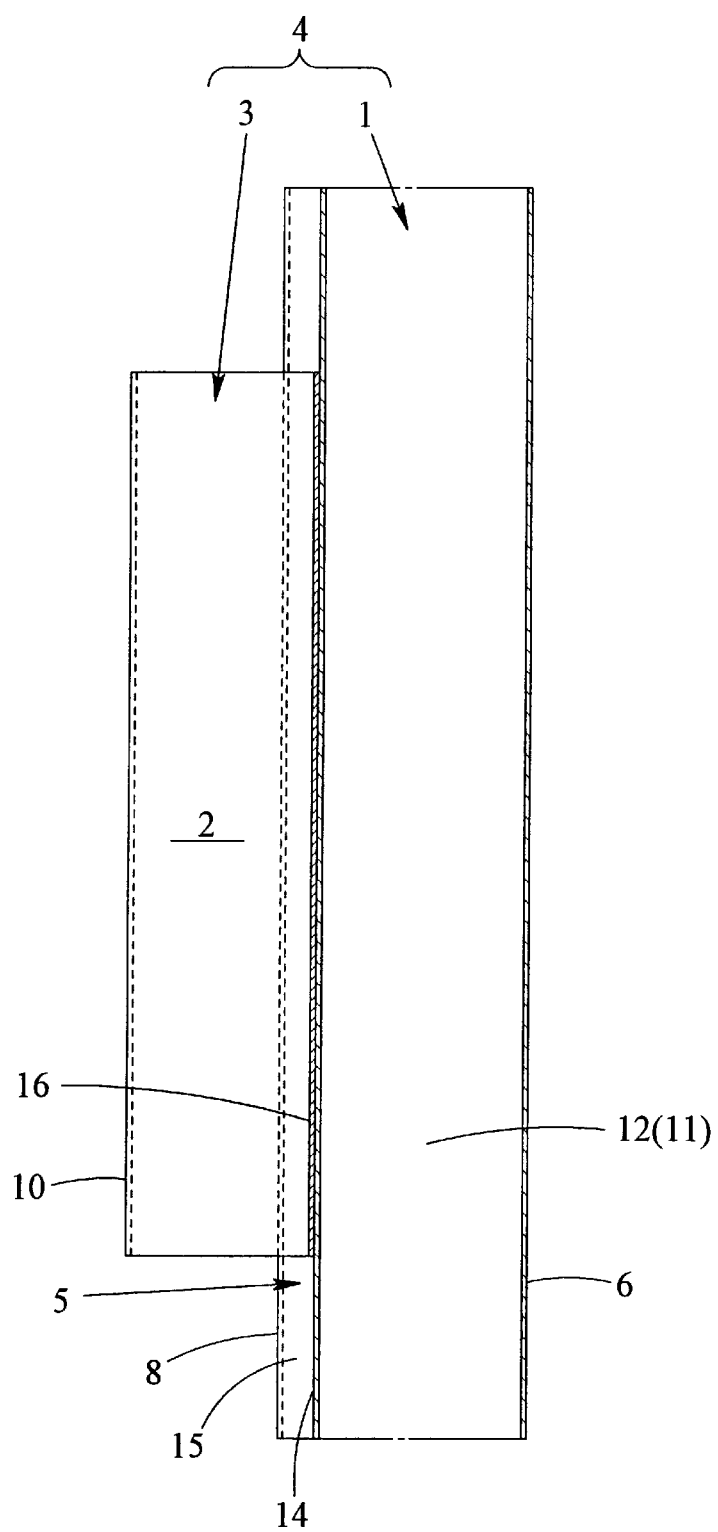
FIG. 3 is a horizontal sectional view of the bumper reinforcement of FIG. 1.

FIG. 1 is a perspective view of a bumper reinforcement 4 in which a reinforcement member 3 having a concave portion 2 of substantially C-shaped cross section is attached to a bumper beam 1 of a closed cross-sectional shape. FIG. 2 is a vertical end elevation of the bumper reinforcement 4, and FIG. 3 is a horizontal sectional view corresponding to FIG. 2. Although the bumper reinforcement 4 of this embodiment is actually curved as seen in FIG. 1, it is shown as a straight part in FIG. 3 for convenience. In this and other embodiments described later, the bumper reinforcement is for a bumper attached to a front side of a vehicle. The reinforcement member 3 is attached to the bumper beam 1 within a predetermined range equidistantly extending in opposite directions from a substantially central point of the bumper beam 1. Alternatively, the reinforcement member may extend over the entire length of the bumper beam. In another alternative form, a plurality of reinforcement member segments may be attached continuously or partially to the bumper beam.

In the bumper reinforcement 4 as shown in FIGS. 1 and 2, a rear (backward) surface 6 of the bumper beam 1, having a structure of a closed cross section provided with a single groove portion 5 integrally by bending a single blank, is connected to a vehicle frame 7 (indicated by dash-and-two-dot lines in FIG. 1). The reinforcement member 3 is attached to the bumper reinforcement 4 on a forward surface 8 thereof remotely from the vehicle frame 7. The bumper is comprised of the bumper reinforcement 4 and a bumper cover 9 concealing the bumper reinforcement 4, and absorbs an impact force F, which is exerted toward the vehicle beyond the bumper cover 9, by plastic deformation of the reinforcement member 3 or the bumper beam 1.

Figure 4:
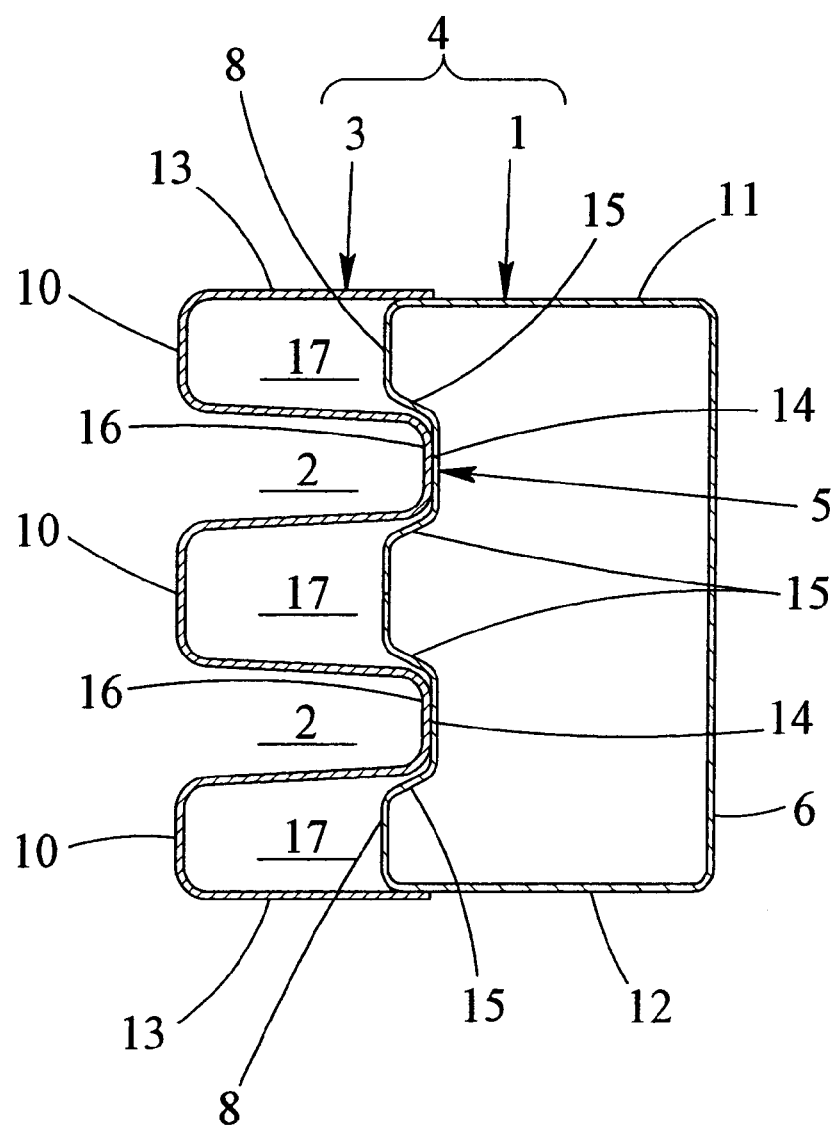
FIG. 4 is an end elevation of a bumper reinforcement of an alternate embodiment of the present invention, showing a reinforcement member having a plurality of concave portions.

The reinforcement member 3 has a concave portion 2 of a substantially C-shaped cross section projecting from a flat forward surface 10 in an impact exertion direction (toward the forward surface 8 of the bumper beam 1), and a pair of support legs 13, 13 extending from symmetrical side edges of the forward surface 10 toward upper and lower surfaces 11, 12 of the bumper beam 1 in parallel to the impact exertion direction so as to be joined with, by overlapping, the upper and lower surfaces 11, 12 of the bumper beam 1, these surfaces being parallel to the impact exertion direction. The bumper beam 1 has a structure of a closed cross section provided by bending a single blank plate so as to connect the symmetrical side edges to each other on the forward side of the bumper beam 1. This closed structure is provided with a groove portion 5 having a surface 14 at a portion where the symmetrical side edges connect to each other, the surface 14 of the groove portion 5 being integrally joined with the forward surface 8 by slant side walls 15, 15 of the groove portion 5. The reinforcement member 3 is attached to the bumper beam 1 by pressing and joining (e.g., spot-welding) the bottom surface 16 of the concave portion 2 of the substantially C-shaped cross section against and to the surface 14 of the groove portion 5. Alternatively, the reinforcement member 3 may have a plurality of concave portions 2, 2 as shown in FIG. 4. In this case, the bumper beam 1 preferably has a plurality of groove portions 5, 5 equal to or more than the number of concave portions 2, 2 of the reinforcement member 3 (may include one or more groove portions not corresponding to the concave portions).

Figure 5:
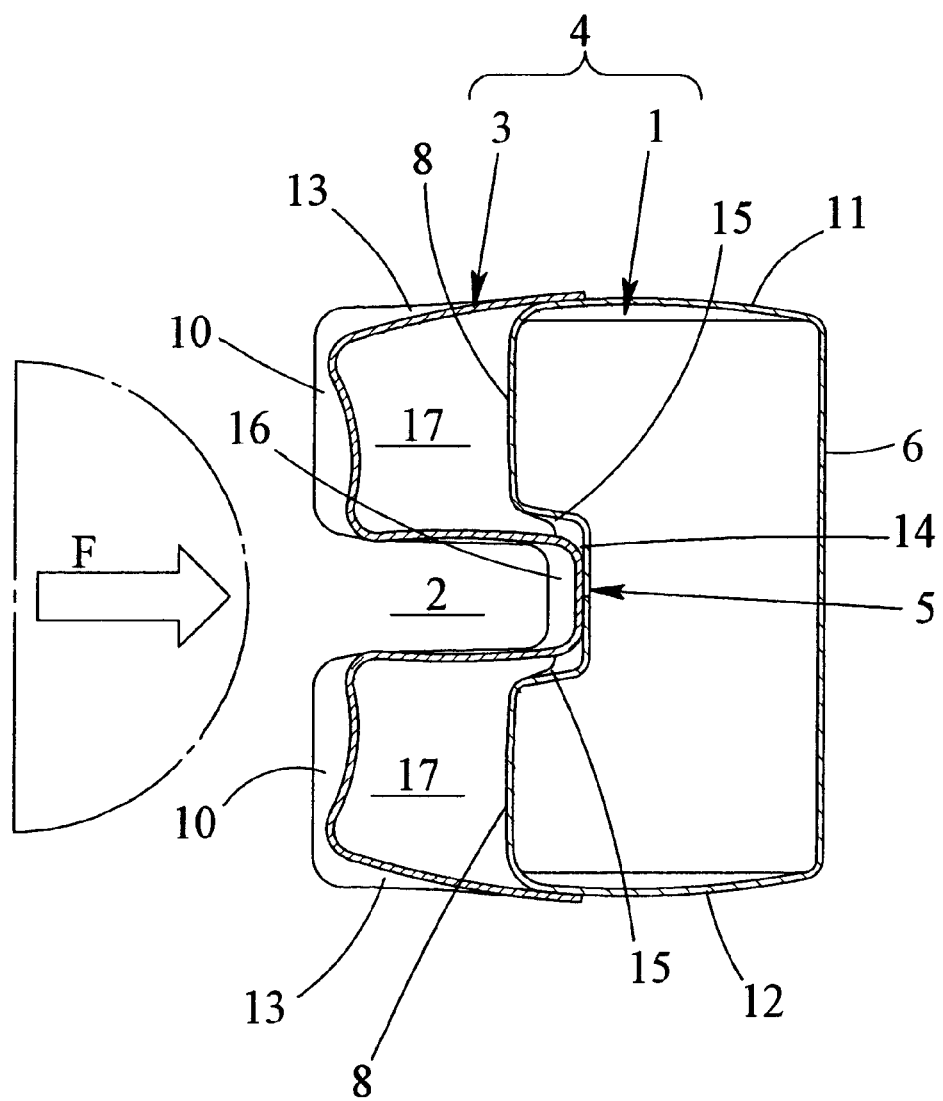
FIG. 5 is a vertical end elevation of the bumper reinforcement of FIG. 1, illustrating how the reinforcement member and the bumper beam deform when an impact force F is exerted on the bumper reinforcement.

In the bumper reinforcement 4 of the present invention, as shown in FIGS. 2 and 3, the forward surface 10 of the reinforcement member, the bottom surface 16 of the concave portion, the groove surface 14 of the bumper beam, and the front or forward surface 8 of the bumper beam are substantially parallel to one another. The impact force F exerted on the bumper reinforcement 4 at the forward side thereof, as shown in FIG. 5 (the bumper cover is not shown in the figure), first compresses a pair of convex (in cross section) portions 17, 17 of the reinforcement member 3 sandwiching the concave portion 2 toward the forward surface 8 of the bumper beam, and then pushes the bottom surface 16 of the concave portion 2 connected to the portion in which the impact force F is exerted, toward the bumper beam 1, thereby causing the forward surface 8 of the bumper beam to plastically deform in accordance with the amount of displacement of the bottom surface 16 of the concave portion of the reinforcement member 3.

Figure 6:
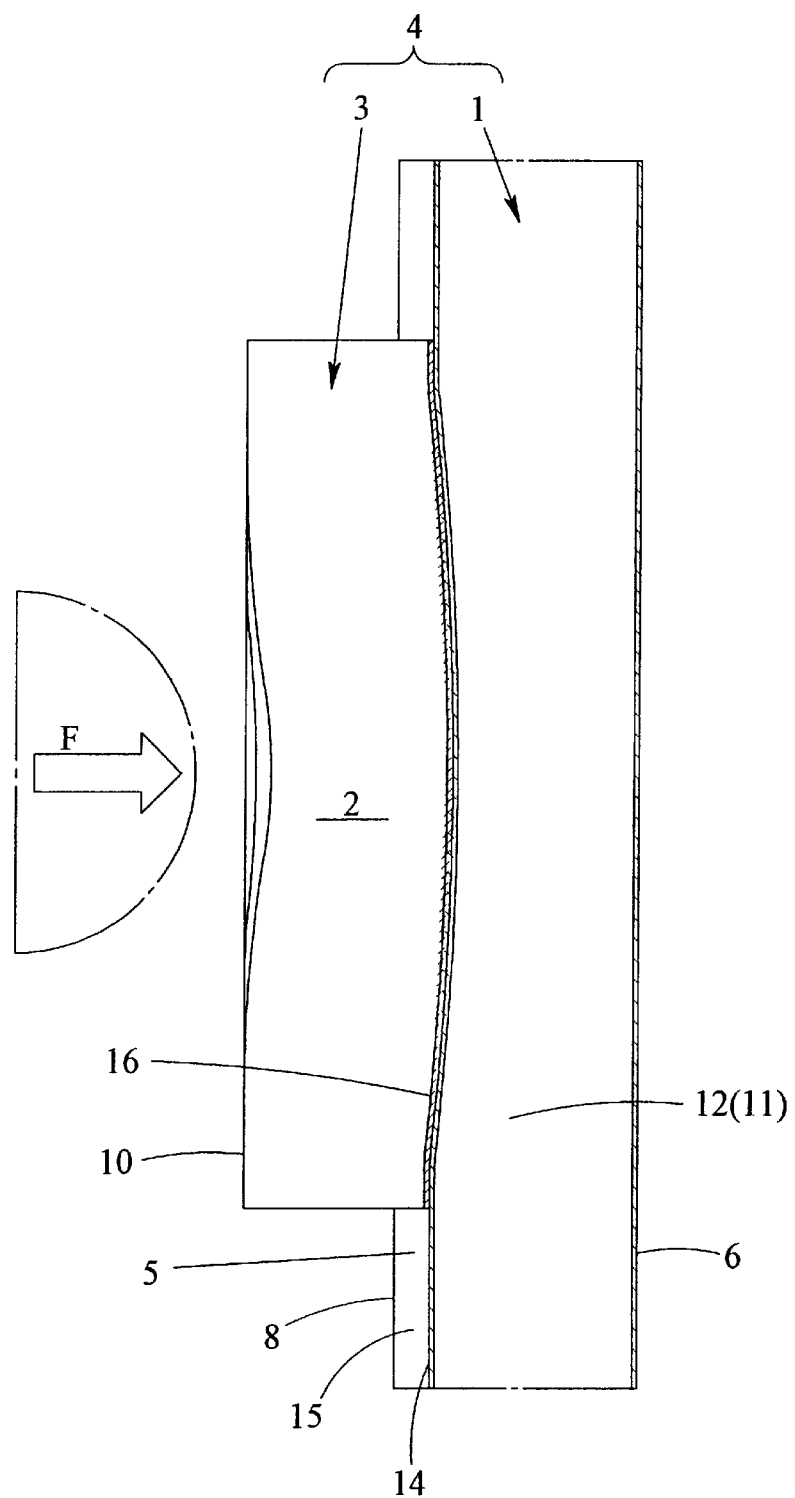
FIG. 6 is a horizontal sectional view corresponding to FIG. 5.

During this plastic deformation, as shown in FIG. 6, the forward surface 8 of the bumper beam bends over a wide range extending longitudinally of the bumper beam 1. Specifically, because the forward surface 8 of the bumper beam is increased in rigidity by the groove portion 5, the forward surface 8 of the bumper beam undergoes not only local deformation (bending) but also plastic deformation over a wide range as portions around the forward surface 8 are pulled by the portion pushed by the bottom surface 16 of the concave portion of the reinforcement member. When substantially convex sectional portions 17 of the reinforcement member 3 are compressed, the upper and lower surfaces 11, 12 of the bumper beam 1 are curved inwardly as if pulled by the support legs 13, 13 of the reinforcement member, and angle of inclination of the slant side walls 15, 15 partly defining the groove portion 5 of the bumper beam 1 become steep with respect to the vertical line while being pressed by the bottom surface 16 of the concave portion of the reinforcement member. These displacements as plastic deformation in various portions around the forward surface 8 of the bumper beam also contribute to impact absorption.

Figure 7:
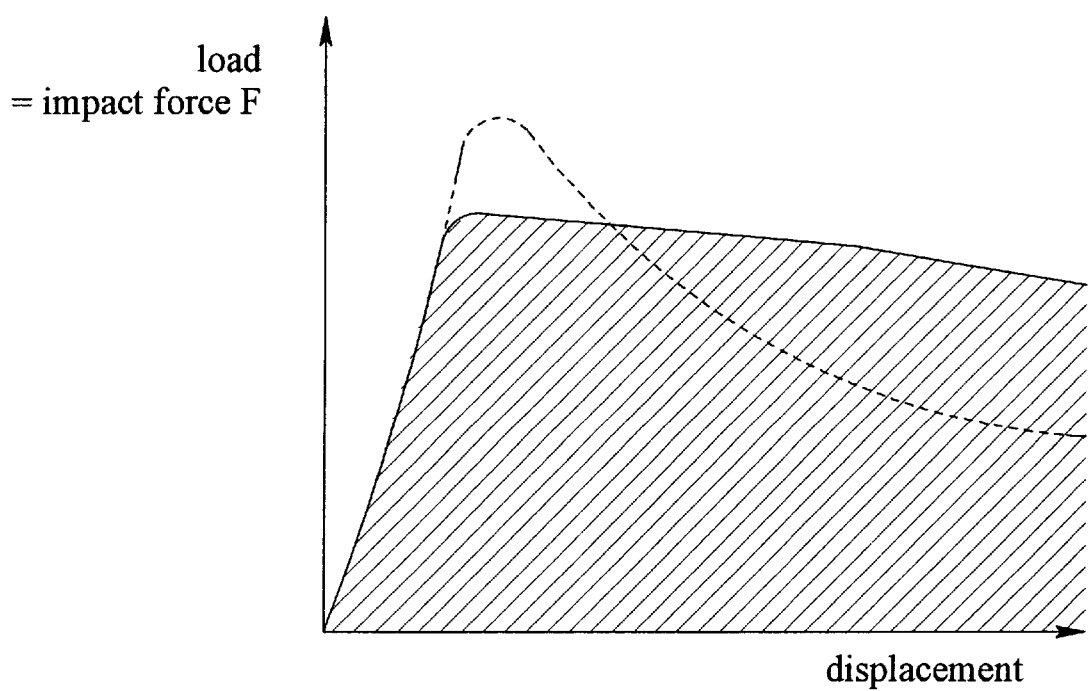
FIG. 7 is a graph showing a relationship between the amount of displacement of the bumper beam and the load necessary to displace the bumper beam by such an amount, in the bumper reinforcement according to the present invention.
Figure 13:
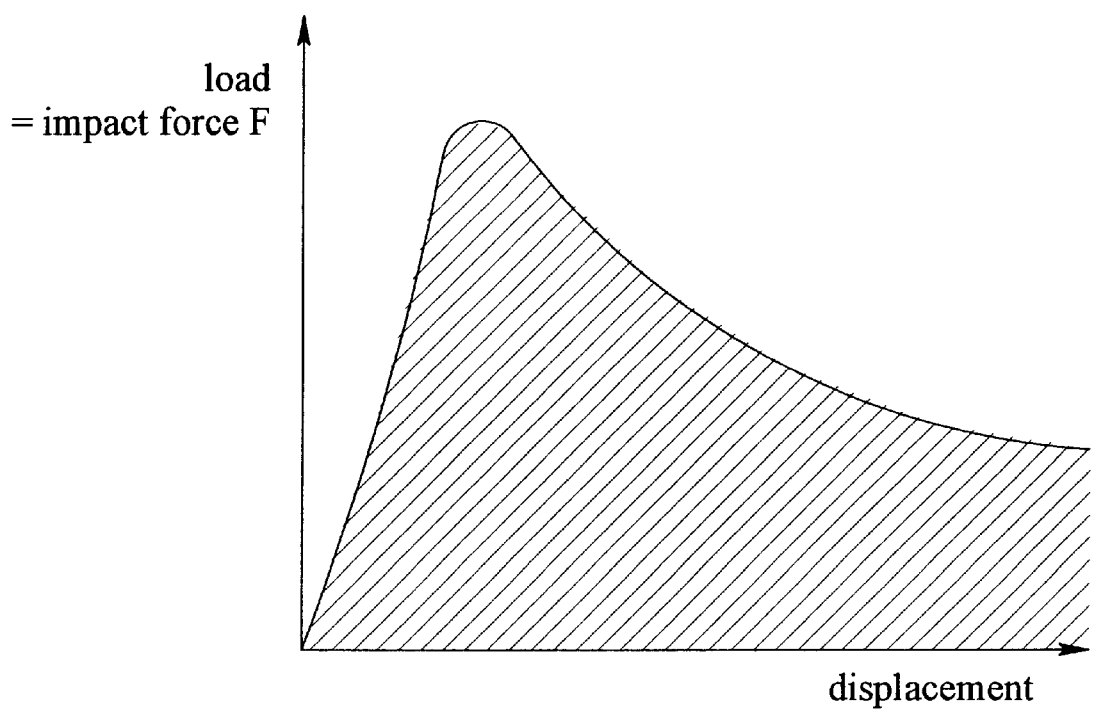
FIG. 13 is a graph showing a relationship between the amount of displacement of the bumper beam and the load necessary to displace the bumper beam to such an amount, in the conventional bumper reinforcement.

In accordance with enlarging the area of deformation in the forward surface 8 of the bumper beam as described above, a graph in FIG. 7, representing the relationship between the amount of displacement of the front surface 8 and the load (=impact force F) necessary to cause displacement by such an amount, shows that the load necessary to cause displacement of the bottom surface 16 of the concave portion of the reinforcement member, which is equal to the displacement of the forward surface 8 of the bumper beam, becomes substantially constant. An equal of displacements between the bottom surface 16 and the front surface 8 is caused by the structure joining the bottom surface 16 of the concave portion with the surface 14 of the groove portion extending contiguously to the front surface 8 of the bumper beam. Since the amount of impact absorption is equal to the area of the hatched region in the graph of FIG. 7, the bumper reinforcement 4 of the present invention can be achieved to improve absorption of the impact force F, apparently from comparison to the hatched area in a graph of FIG. 13 describing absorption of the conventional bumper reinforcement as well as the area indicated by a broken line in FIG. 7.

Figure 8:
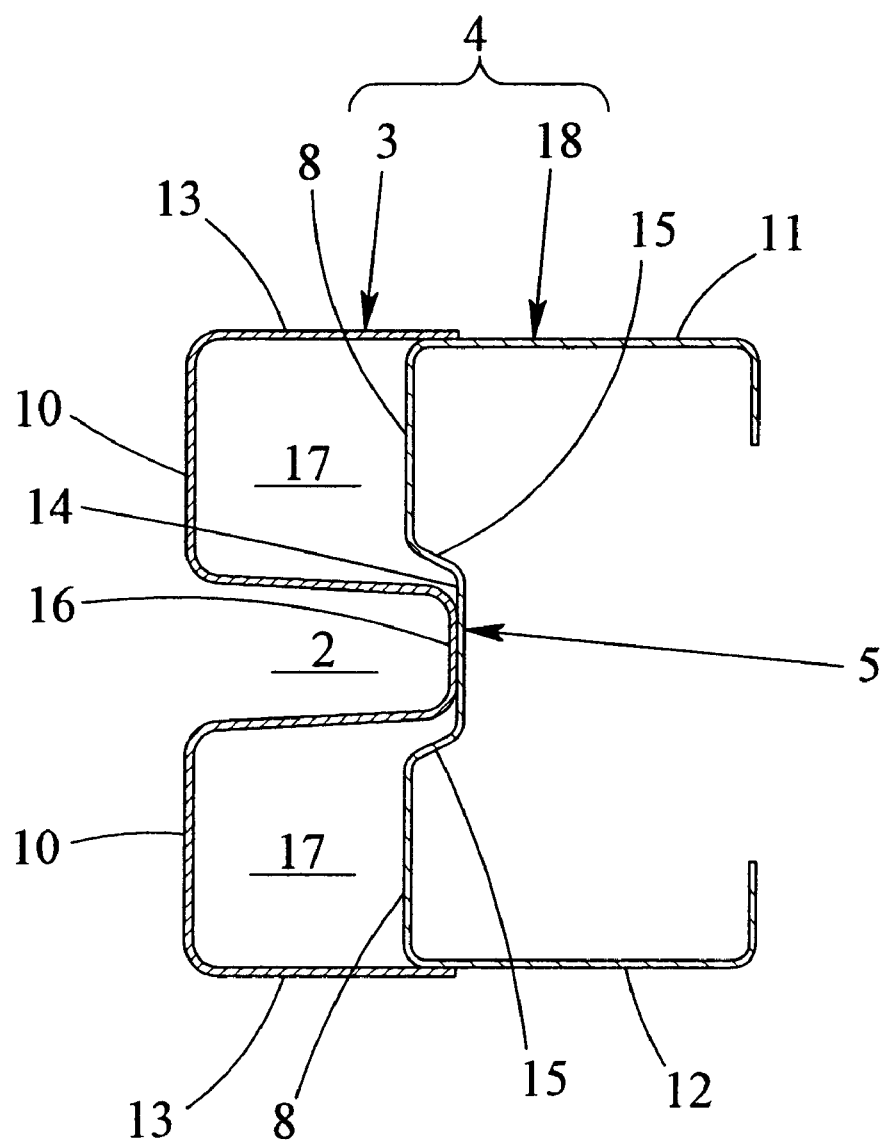
FIG. 8 is a vertical end elevation of a bumper reinforcement of a further alternate embodiment of the present invention.
Figure 9:
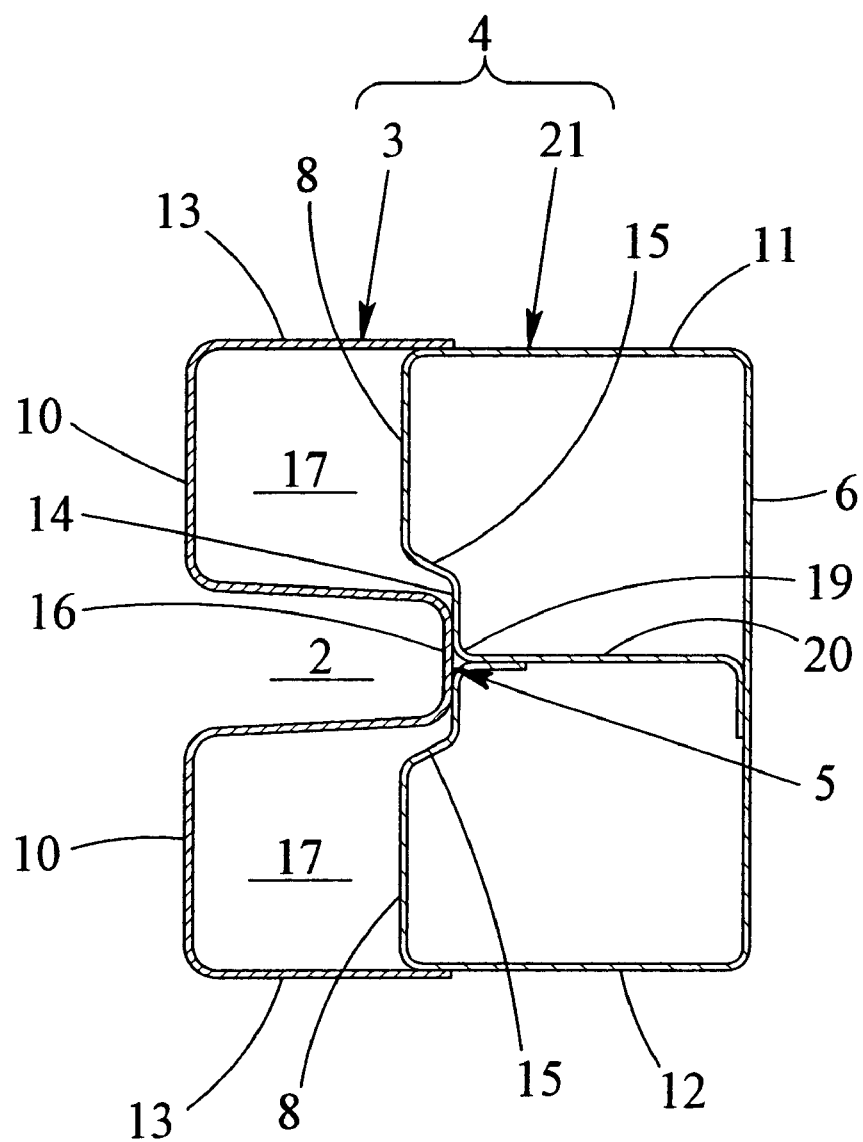
FIG. 9 is a vertical end elevation of a bumper reinforcement of a furthermore alternate embodiment of the present invention.
Figure 10:
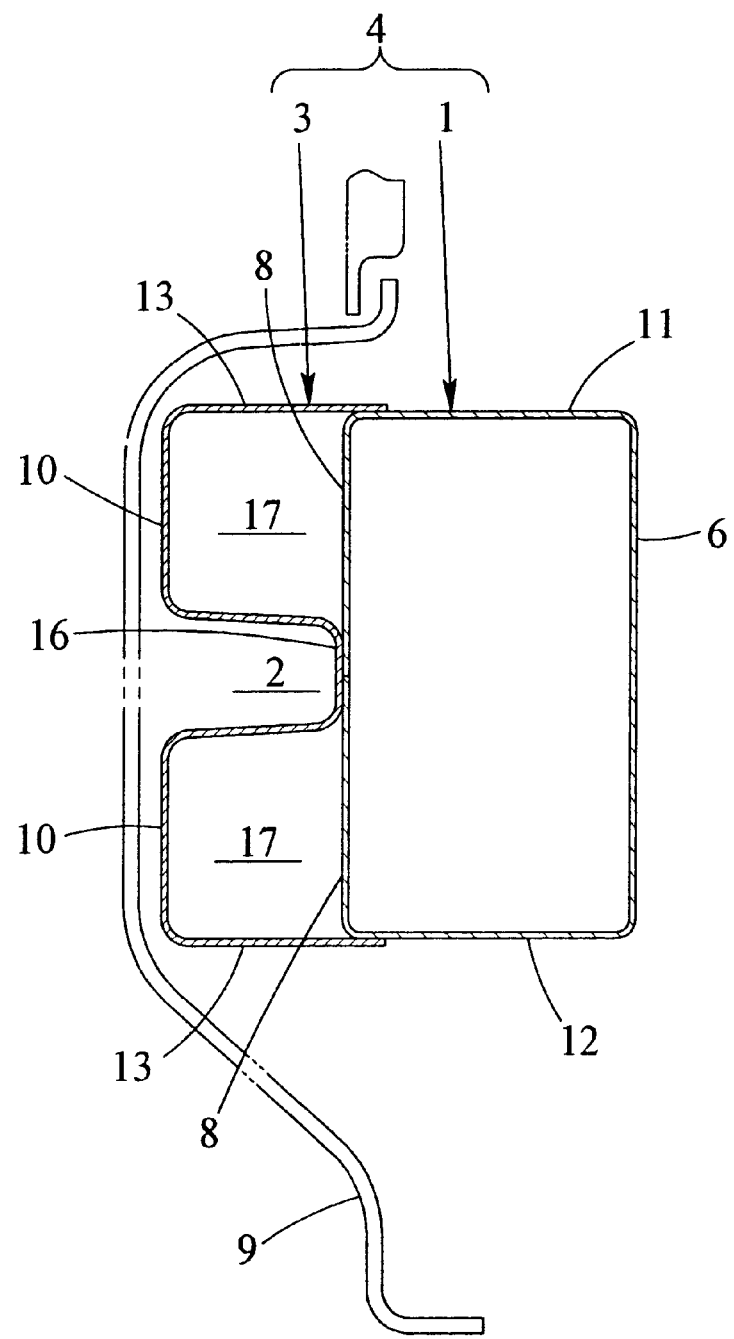
FIG. 10 is a vertical end elevation of a conventional bumper reinforcement.
Figure 11:
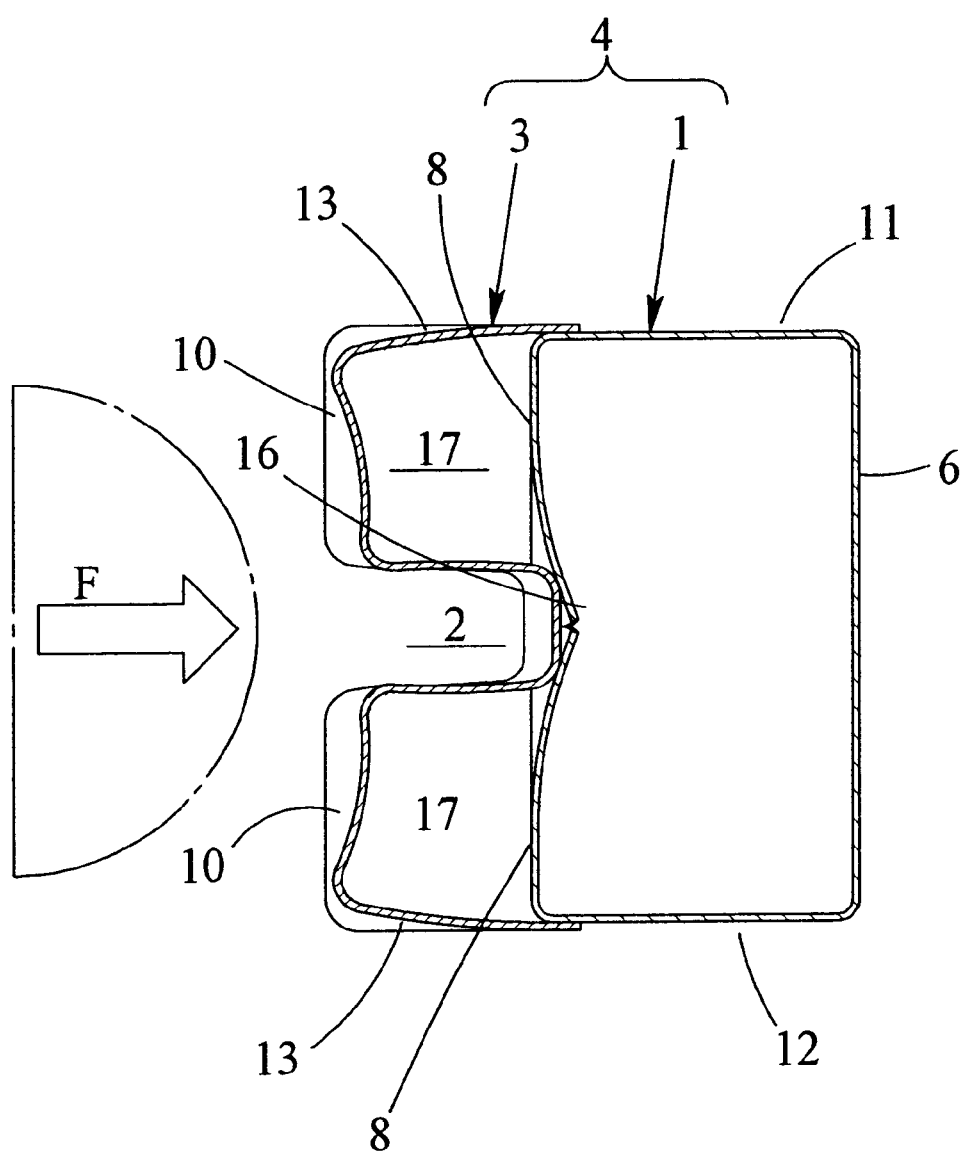
FIG. 11 is a vertical end elevation of the conventional bumper reinforcement, showing how a reinforcement member and a bumper beam deform when an impact force F is exerted on the reinforcing member.
Figure 12:
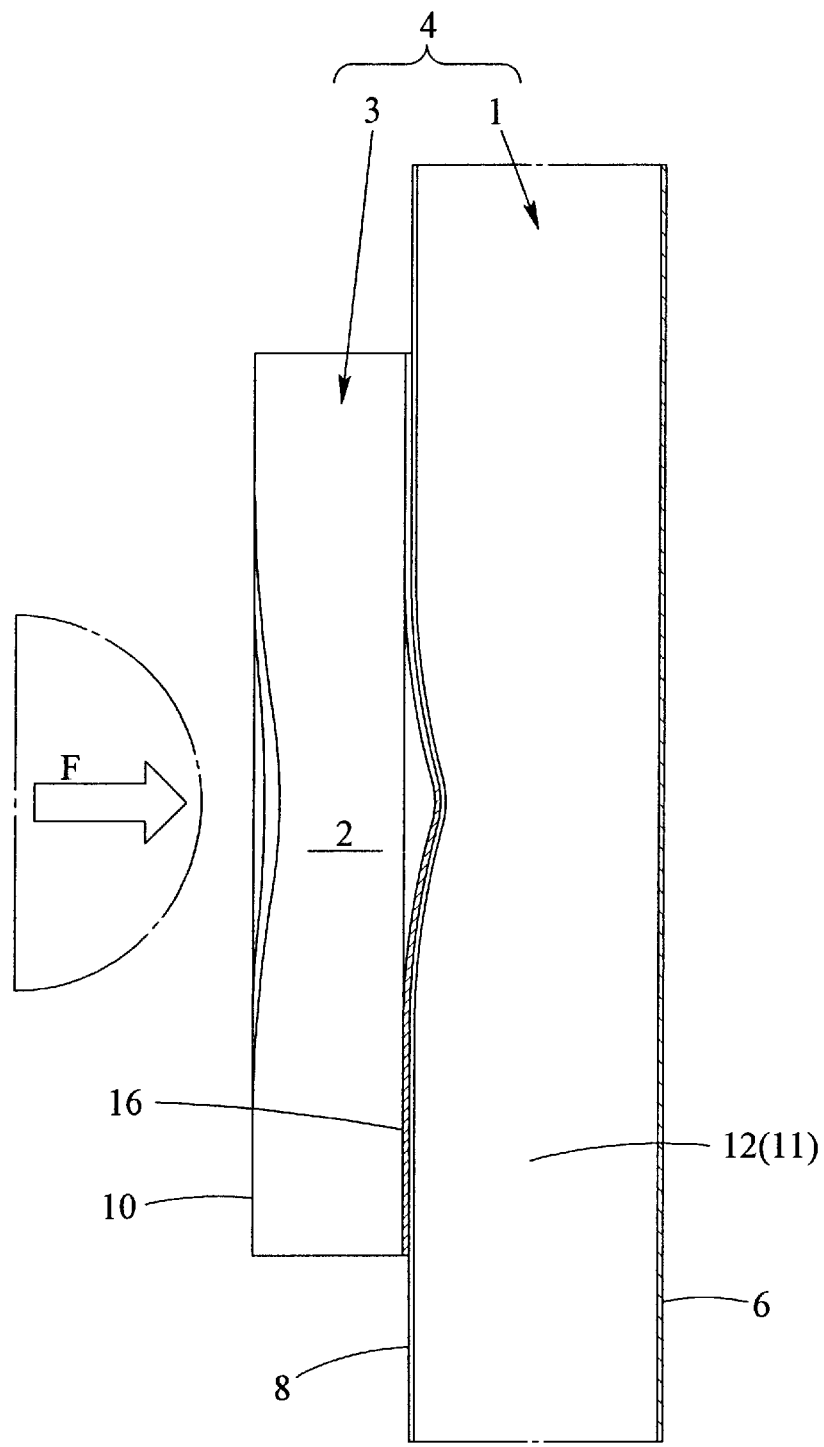
FIG. 12 is a horizontal sectional view corresponding to FIG. 11.

The impact absorption performance of the bumper reinforcement 4 can be easily adjusted by changing the structure of the reinforcement member 3 and/or the structure of the bumper beam 1. For example, by using a modified bumper beam 18 having a structure of an open cross-sectional shape, as shown in FIG. 8, provided by bending symmetrical side edges of a single blank plate so as to extend toward and terminating short of each other with a gap therebetween, the upper and lower surfaces 11, 12 of the modified bumper beam 18 is allowed to displace with an increased degree of freedom compared to the bumper beam 1 in FIG. 2 so that plastic deformation of the forward surface 8 can easily occur with the compression of the reinforcement member 3, thereby reducing the amount of impact absorption of the bumper reinforcement 4. In another alternative form, by using a modified bumper beam 21 having a structure of an closed cross-sectional shape, as shown in FIG. 9, provided by folding one side edge of a single blank plate inwardly with the other side edge connecting to the folded-in edge portion 19 with the one side edge terminating in a reinforcing rib 20 connecting to an inside surface of the bent plate diametrically, the reinforcing rib 20 restricts an amount of plastic deformation of the front surface 8 of the bumper beam with compression of the reinforcement member 3, thereby increasing the amount of impact absorption of the bumper reinforcement 4.

According to the present invention, as described herein above, it is to provide a bumper reinforcement that has excellent impact absorption performance with the reliability as a security device. Further, according to easy manufacturing without special members, the bumper reinforcement of the present invention can also provide a high cost performance for production without changing the materials and/or factory facilities.

What is claimed is:

1. A bumper reinforcement attached to a front side or a rear side of a vehicle frame as a strength member, comprising:
   a bumper beam to be supported on the vehicle frame, and
   a reinforcement member attached to the bumper beam on a forward side thereof which is upstream with respect to an impact exertion direction, wherein:
      the reinforcement member has a concave portion of a substantially C-shaped cross section projecting in a downstream direction reverse to the impact exertion direction,
      the bumper beam has, on the forward surface to which the reinforcement member is attached, a groove portion extending longitudinally of the bumper beam, and
      a bottom surface of the concave portion of the reinforcement member engages with a surface of the groove portion of the bumper beam.

2. The bumper reinforcement according to claim 1, wherein the reinforcement member has a pair of support legs extending from edges of the concave portion of the C-shaped cross section to the bumper beam parallel to the impact exertion direction so as to be joined by overlapping to corresponding side surfaces of the bumper beam, the side surfaces being parallel to the impact exertion direction.

3. The bumper reinforcement according to claim 1, wherein the bumper beam has a structure of a closed cross-sectional shape provided by bending a single blank plate in such a manner that symmetrical side edges of the single blank plate connect to each other.

4. The bumper reinforcement according to claim 1, wherein the bumper beam has a structure of an open cross-sectional shape provided by bending a single blank plate in such a manner that symmetrical side edges of the single blank plate confront each other.

5. The bumper reinforcement according to claim 3, wherein the bumper beam has a dual-tube structure of a closed cross-sectional shape provided by bending a single blank plate in such a manner that one of symmetrical side edges of the single blank plate is folded inwardly with the other side edge of the single blank plate connecting to a folded-in edge portion, and that the folded side edge of the single blank plate terminates in a reinforcing rib connecting to an inside surface of the bent plate diametrically.

* * * * *